United States Patent Office.

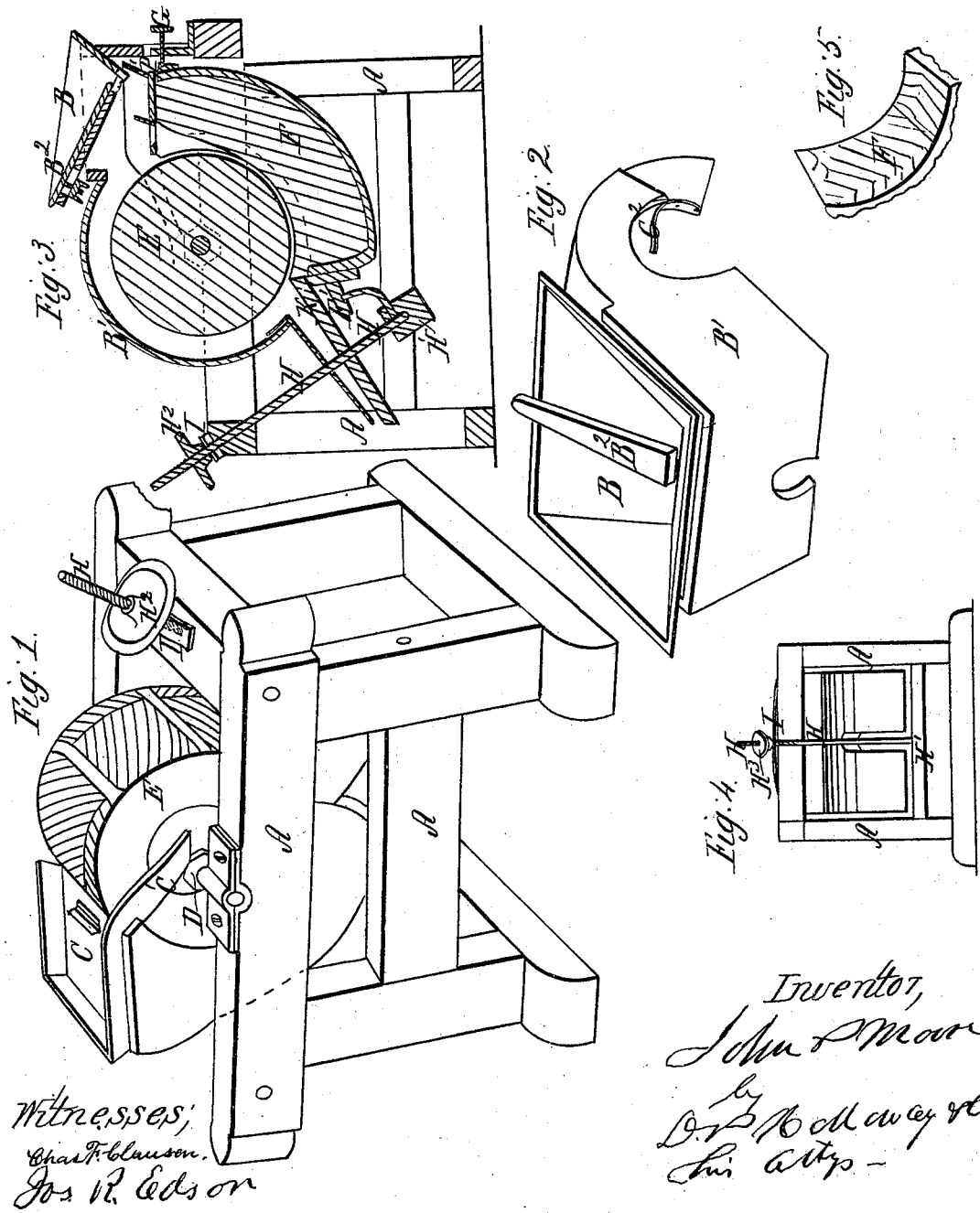

JOHN P. MOORE, OF MORNING VIEW, KENTUCKY.

Letters Patent No. 78,814, dated June 9, 1868.

IMPROVED GRINDING-MILL.

The Schedule referred to in these Letters Patent and making part of the same.

TO ALL WHOM IT MAY CONCERN:

Be it known that I, JOHN P. MOORE, of Morning View, in the county of Kenton, and State of Kentucky, have invented a new and useful Improvement in Mills for Grinding Grain; and I do hereby declare that the following is a full, clear, and exact description of the same, reference being had to the annexed drawings, making part of this specification, in which—

Figure 1 is a perspective view.
Figure 2 is a perspective view of the hopper.
Figure 3 is a vertical section.
Figure 4 is a front elevation in part; and
Figure 5 is a perspective view of the face of the lower stone.

The same letters in all the figures are used to indicate identical parts.

This improvement relates to the construction and arrangement of a mill for grinding grain, using a cylindrical runner and concave bed-stone.

In the annexed drawings, A is the husk, and B is the hopper attached to the case $B^1$, which rests on the top of the husk, covering the top of the runner and the shoe and spout. The slide $B^2$ is fixed by a set-screw, in such manner as may be desired to regulate the feed. C is the shoe, which is hinged to the casing of the bed-stone, and is agitated by means of an arm, $C^1$, resting upon a knocker, D, set on the shaft of the runner. The spring $C^2$, attached to the case, presses on top of the arm $C^1$. The runner E and bed-stone F are made of French burr. The runner is a cylinder hung upon a shaft, the journals of which run in boxes on the husk. The top of the case enclosing the bed-stone rests against a set-screw, G, which regulates the distance of the top of the bed-stone from the runner. The lower end of the case enclosing the bed-stone is suspended by a hook attached to the rod H, which, resting on the bridge-tree $H^1$, and being raised or depressed by the nut $H^2$, is used for regulating the relation of the bed-stone to the runner, to vary the character of work done, according to circumstances. The nut $H^2$ rests on a spring-plate, I, the elasticity of which is sufficient to yield to any hard substance entering with the grain, and which might otherwise injure the stone. K is the spout formed in the case to discharge the meal.

What I claim as my invention, and desire to secure by Letters Patent, is—

Supporting the lower edge of the bed-stone F by means of the screw-rod H, nut $H^2$, and spring I, arranged as herein described, for the purpose of giving elasticity to the bed-stone in its relation to the runner.

In testimony whereof, I have signed my name to this specification in the presence of two subscribing witnesses.

J. P. MOORE.

Witnesses:
R. MASON,
CHAS. F. CLAUSEN.